United States Patent
Lin et al.

(10) Patent No.: US 9,409,148 B2
(45) Date of Patent: Aug. 9, 2016

(54) COMPOSITIONS AND METHODS FOR DIRECT CAPTURE OF ORGANIC MATERIALS FROM PROCESS STREAMS

(71) Applicant: UChicago Argonne, LLC, Chicago, IL (US)

(72) Inventors: YuPo J. Lin, Naperville, IL (US); Richard W. Brotzman, Naperville, IL (US); Seth W. Snyder, Lincolnwood, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 297 days.

(21) Appl. No.: 13/962,480

(22) Filed: Aug. 8, 2013

(65) Prior Publication Data

US 2015/0041400 A1     Feb. 12, 2015

(51) Int. Cl.
*B01J 20/32* (2006.01)
*B01J 20/28* (2006.01)
*B01J 20/02* (2006.01)

(52) U.S. Cl.
CPC .......... *B01J 20/3293* (2013.01); *B01J 20/0225* (2013.01); *B01J 20/28007* (2013.01); *B01J 20/28009* (2013.01); *B01J 20/28026* (2013.01); *B01J 20/3285* (2013.01)

(58) Field of Classification Search
CPC ............. B01J 20/28026; B01J 20/2803; B01J 20/3231; B01J 20/3238; B01J 20/3268; B01J 20/3285; B01J 20/3293; B01J 20/28009; B01J 20/28004; B01J 20/28007; B01J 20/3204; B01J 20/3259; B01J 20/0225; B01J 20/0229; B01J 20/223; B01J 20/265; B01J 2220/46
See application file for complete search history.

(56) References Cited

U.S. PATENT DOCUMENTS

| 5,549,973 A | 8/1996 | Majetich et al. |
| 5,783,263 A | 7/1998 | Majetich et al. |

(Continued)

FOREIGN PATENT DOCUMENTS

| WO | 9933072 | 7/1999 |
| WO | 9962079 | 12/1999 |

(Continued)

OTHER PUBLICATIONS

Boyer et al., The design and utility of polymer-stabilized iron-oxide nanoparticles for nanomedicine applications, Jan. 2010, NPG Asia Materials, pp. 23-30.*

(Continued)

*Primary Examiner* — David C Mellon
(74) *Attorney, Agent, or Firm* — Olson & Cepuritis, Ltd.

(57) ABSTRACT

A particulate magnetic nanostructured solid sorbent (MNSS) material is described herein. The particles of the MNSS comprise a plurality of tethered nanoparticles. The nanoparticles are tethered together by substantially linear hydrocarbon chains, a poly(alkylene oxide) chains, or a combination thereof connecting the nanoparticles in a three-dimensional elastic network with the nanoparticles as junctions of the network having junction functionality of about 2.1 to about 6. The surfaces of at least some of the nanoparticles comprise a polymerized siloxane bearing at least one sorption-aiding substituent selected from a hydrophilic group and a lipophilic group. The plurality of nanoparticles is made up of superparamagnetic nanoparticles or a combination of superparamagnetic and non-magnetic nanoparticles. The individual superparamagnetic nanoparticles comprise a passivating metal oxide coating around a core comprising at least one nanocrystalline metal or alloy having ferromagnetic or ferrimagnetic properties.

20 Claims, 1 Drawing Sheet

(56) References Cited

U.S. PATENT DOCUMENTS

| | | |
|---|---|---|
| 5,993,967 A | 11/1999 | Brotzman, Jr. et al. |
| 6,033,781 A | 3/2000 | Brotzman, Jr. et al. |
| 6,150,181 A | 11/2000 | Halbreich et al. |
| 6,255,477 B1 | 7/2001 | Kleiber et al. |
| 6,491,842 B1 | 12/2002 | Bonnemann et al. |
| 6,545,143 B1 | 4/2003 | Harttig et al. |
| 6,548,264 B1 | 4/2003 | Tan et al. |
| 6,676,729 B2 | 1/2004 | Sun |
| 6,830,694 B2 | 12/2004 | Schiestel et al. |
| 6,870,047 B2 | 3/2005 | Kleiber et al. |
| 6,919,444 B2 | 7/2005 | Harttig et al. |
| 7,182,938 B2 | 2/2007 | Andre et al. |
| 7,186,398 B2 | 3/2007 | Andres et al. |
| 7,202,667 B2 | 4/2007 | Barbic |
| 7,303,819 B2 | 12/2007 | Brotzman, Jr. |
| 7,371,830 B2 | 5/2008 | Kleiber et al. |
| 7,429,339 B2 | 9/2008 | Renaud et al. |
| 7,524,630 B2 | 4/2009 | Tan et al. |
| 7,699,979 B2 | 4/2010 | Li et al. |
| 7,731,648 B2 | 6/2010 | Ivkov |
| 7,795,041 B2 | 9/2010 | Hatton et al. |
| 7,938,969 B2 | 5/2011 | Colvin et al. |
| 7,993,541 B1 | 8/2011 | Bhargava et al. |
| 8,084,275 B2 | 12/2011 | Hirai et al. |
| 8,129,118 B2 | 3/2012 | Weindel et al. |
| 8,297,444 B2 | 10/2012 | Miller |
| 2005/0095726 A1 | 5/2005 | Fang et al. |
| 2005/0215687 A1 | 9/2005 | Hatton et al. |
| 2007/0154903 A1 | 7/2007 | Marla et al. |
| 2007/0281324 A1 | 12/2007 | Perriat et al. |
| 2009/0309597 A1 | 12/2009 | Horak et al. |
| 2010/0059449 A1 | 3/2010 | Grass et al. |
| 2010/0243574 A1 | 9/2010 | Markov et al. |
| 2012/0070858 A1 | 3/2012 | Contreras et al. |
| 2012/0094275 A1 | 4/2012 | Rao et al. |
| 2012/0135080 A1 | 5/2012 | Bromberg et al. |
| 2012/0141602 A1 | 6/2012 | Escolano et al. |
| 2012/0305491 A1 | 12/2012 | Ghandi |

FOREIGN PATENT DOCUMENTS

| | | |
|---|---|---|
| WO | 0110558 A1 | 2/2001 |
| WO | 0173123 A2 | 10/2001 |
| WO | 0206790 A1 | 1/2002 |
| WO | 2005076938 A2 | 8/2005 |
| WO | 2009122216 A1 | 10/2009 |
| WO | 2010151085 A2 | 12/2010 |

OTHER PUBLICATIONS

Song et al., Elastomeric Nanoparticle Composites Covalently Bound to Al2O3/GaAs Surfaces, 2007, Langmuir, 23, pp. 9472-9480.*

Brotzman, R.W. et al., The Elastic Behavior of Cis-1,4-Polybutadiene, Advances in Elastomers and Rubber Elasticity, ACS Symposium Series, Plenum, 361-377 (1986).

Brotzman, R.W. et al., Elastic Behavior of cis-1,4-Polybutadiene, Macromolecules 20, 351-356 (1987).

Brotzman, R.W. et al., Volume Dependence of the Elastic Equation of State. 3. Bulk-Cured Poly(demethylsiloxane), Macromolecules 15, 531-535 (1982).

Brotzman, R.W. et al., Volume Dependence of the Elastic Equation of State. 2. Solution-Cured Poly (demethylsiloxane), Macromolecules 14, 1445-1448 (1981).

Brotzman, R.W. et al., Swelling of Model Poly(dimethylsiloxane) Networks, Macromolecules 16, 1131-1136 (1983).

Brotzman, R.W. et al., Examination of the Critical Parameters in the Constrained Junction Theory of Rubber Elasticity, Macromolecules 19, 667-675 (1986).

Dillon, A.C. et al., Surface Chemistry of Al2O3 Deposition Using Al(CH3)3 and H2O in a Binary Reaction Sequence, Surface Science 322, 230-242 (1995).

Kodama, D. et al., Synthesis of Size-Controlled Fe—Co Alloy Nanoparticles by Modified Polyol Process, Journal of Magnetism and Magnetic Materials 310, 2396-2398 (2007).

Pena, L. et al., Cellobiose Hydrolysis Using Acid-Functionalized Nanoparticles, Biotechnology and Bioprocess Engineering 16, 1214-1222 (2011).

Ritala, M. et al., Atomic Layer Deposition, Handbook of Thin Film Materials, vol. 1: Deposition and Processing of Thin Films, 103-159 (2002).

* cited by examiner

COMPOSITIONS AND METHODS FOR DIRECT CAPTURE OF ORGANIC MATERIALS FROM PROCESS STREAMS

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

The present invention relates to the separation of organic materials, such as sugars, lipids, and hydrocarbons, from process streams. More particularly, this invention relates to magnetic nanostructured solid sorbent (MNSS) materials comprising superparamagnetic nanoparticles with functionalized surfaces that can sorb a target organic material from a process stream, and to methods of separating a target organic material from a process streams utilizing the MNSS.

BACKGROUND OF THE INVENTION

Non-petroleum-based alternative feedstocks for the production of organic materials (e.g., sugars, linear hydrocarbons, lipids) potentially offer the chemical industry substantial economic and environmental benefit by supplementing or displacing petroleum products in chemical and energy markets. For example, the extraction of sugars (e.g., glucose and xylose) from lignocellulose biomass during the pretreatment stage is a focused research and development effort by the U.S. Department of Energy and by private industry for production of biofuels, bio-based products, and biochemicals. Bioprocess pretreatment technologies generally produce a low titer of target organic products, which requires significant downstream product separations to purify the target materials from complex mixtures, and dewatering to concentrate the target materials to useful concentrations. A technoeconomic assessment of the fermentation of sugars from corn stover to produce cellulosic ethanol found that one third of the production costs came from the pretreatment stage. The separation and concentration of ethanol, which is limited by the sugar titer, consumed half of the total process energy budget.

For example, sugar concentration in most pretreated lignocellulose hydrolysate (i.e., the liquid fraction of dissolved sugar molecules in a pretreatment slurry) is approximately 2 to 10 percent by weight (wt %). Removal of water from the hydrolysate to increase the sugar concentration is expensive. In another example, phototrophic and heterotrophic algae are used to produce lipids for biofuel production. The ultimate lipid content in the algal slurries may be less than 1 wt %. Removal of water from the lipid can use more energy than is contained in the lipid product.

Magnetic nanoparticles of various types have been used in biomass processing. For example, acid-functionalized nanomaterials reportedly were useful for the pretreatment and hydrolysis of lignocellulosic biomass (L. Pena, M. Ikenberry, B. Ware, K. L. Hohn, D. Boyle, X. S. Sun, and D. Wang, "Cellobiose Hydrolysis Using Acid-functionalized Nanoparticles," *Biotechnology and Bioprocess Engineering*, 2011; 16(6):1214-1222). In this study, cobalt spinel ferrite ($CoFe_2O_4$) nanoparticles were surface treated with silica and functionalized to varying degrees with acid groups. The functionalized nanoparticles were utilized as acidic processing aids to hydrolyze lignocellulose, and the particles were then magnetically separated from the reaction medium and reused. Although cellobiose hydrolysis was observed, nanoparticle aggregation occurred, the result of ferromagnetic behavior of silica-coated metal oxide nanoparticles (large XRD peaks were observed, and hydrolysis degraded with cycle count). The acidic nanoparticles in this study were utilized as a hydrolyzing agent, and the resulting sugars were isolated and concentrated by conventional means. Magnetic separation processes also have been used in solid waste disposal and recycling operations.

Flotation has been used in separation processes, as well. Such separations often depend on density or wettability differences to separate product components. However, the use of sorbents, which are surface treated to selectively capture sugar or other targeted organic products, and capable of being separated from complex process streams by flotation has not been reported.

The passivation and functionalization of particles has been addressed over the years by many different techniques and chemical efforts. Functional magnetic nanoparticles that can be separated from a fluid using a magnetic field have been described in, e.g., in U.S. Pat. No. 7,795,041 to Hatton et al., which is incorporated herein by reference in its entirety. The magnetic nanoparticles described by Hatton et al. were directly embedded into and non-covalently bound with a polymer, and lacked chemical stability, which led to the loss of magnetization of the particles over time and particle dissolution under conditions of the process environment.

Others have coated the surface of particles to modify the physical or chemical properties of the particle surfaces. Sorption, ion exchange or binding, and covalent bonding techniques have conventionally been used to coat particulate surfaces. Sorption and ion exchange require the surface to have the appropriate chemical characteristics, and reactions that enable covalent bonding to particle surfaces generally involve reactions with surface-bound hydroxyl groups. U.S. Pat. No. 7,524,630 to Tan et al., which is incorporated herein by reference in its entirely, describes nanoparticles having a core/shell structure with a magnetic core and silicon oxide shell surface-functionalized with biologically active molecules such as antibodies and nucleotides. The nanoparticles of U.S. Pat. No. 7,524,630 reportedly are useful to label cells, to detect and isolate nucleic acid molecules having specific nucleotide sequences, and to separate a mixture of different nucleic acid molecules. More specifically, U.S. Pat. No. 7,524,630 discloses a pre-formed silica surface being conjugated with at least one functional group comprising an oligonucleotide in the form of a molecular beacon, in which the oligonucleotide comprises a single-stranded loop structure comprising a nucleic acid sequence of interest. However, biologically active molecules such as nucleotides or antibodies conjugated to the particle surface are rapidly consumed or degraded by deleterious compounds present in the biomass-process environment, and thus cannot be used for sorption of targeted organic materials in such processes.

U.S. Pat. No. 6,548,264 to Tan et al., which is incorporated herein by reference in its entirety, discloses silica-coated nanoparticles and a process for producing silica-coated nanoparticles. Silica-coated nanoparticles in accordance with U.S. Pat. No. 6,548,264 are prepared by precipitating nano-sized cores from reagents dissolved in the aqueous compartment of a water-in-oil microemulsion. A reactive silicate is added to coat the cores with silica. The method employs a microemulsion, i.e., isotropic and thermodynamically stable single-phase system, to produce nanoparticle cores of a predetermined, very uniform size and shape. The coated nanoparticles reportedly can be customized for a particular application by derivatizing various chemical groups onto the pre-formed silica coating. However, the microemulsion synthesis described in U.S. Pat. No. 6,548,264 is cumbersome, cannot be readily scaled up, and requires purification of the particles from the surfactant employed to create the microemulsion.

Others have found similar methods of nanoparticle functionalization to be useful for isolation of biological material such as nucleic acids, medical screening, monitoring for chemotherapy, treatment responses, cancer recurrence or the like. Typically these coatings are thin surface treatments on metal oxide cores, which afford dispersion compatibility and, for the best available technology, control particulate aggregation, but cannot prevent ion migration from reactive (e.g., metal) particles or affect ultimate sorption properties.

There is an ongoing need for alternative materials and methods for separating target organic products such as sugars, lipids, and hydrocarbons, from fluids such as bioprocess streams. The compositions and methods described herein address this ongoing need.

SUMMARY OF THE INVENTION

A particulate magnetic nanostructured solid sorbent (MNSS) material is described herein. The particles of the MNSS material comprise a plurality of tethered nanoparticles. The nanoparticles are tethered together by molecular chains comprising a substantially linear hydrocarbon chain, a poly(alkylene oxide) chain, or a combination thereof connecting the nanoparticles (e.g., by covalent bonds to the nanoparticles or in the surface proximity of the nanoparticles) in a three-dimensional elastic network having a junction functionality of about 2.1 to about 6, with the nanoparticles as junctions of the network. The surfaces of at least some of the nanoparticles comprise a polysiloxane bearing sorption-aiding substituents, which can be hydrophilic groups, lipophilic group, or a combination thereof. The plurality of nanoparticles is made up of superparamagnetic nanoparticles or a combination of superparamagnetic and non-magnetic nanoparticles. The cores of the superparamagnetic nanoparticles are metallic and comprise at least one nanocrystalline metal (e.g., a single metal or an alloy) having ferromagnetic or ferrimagnetic properties. The superparamagnetic nanoparticles comprise a passivating metal oxide coating around a nanocrystalline core. The non-magnetic nanoparticles preferably are composed of a nanocrystalline metal oxide. Unlike magnetic nanoparticle materials described in the prior art, which comprise discrete magnetic nanoparticles or clusters of magnetic nanoparticles in direct contact with each other, the nanoparticles of the particulate MNSS materials described herein are tethered together in an elastic network. The molecular size of tethering chains allow the nanoparticles sufficient flexibility to orient freely in an applied external magnetic field, while at the same time inhibiting undesirable direct nanoparticle-to-nanoparticle aggregation.

In use, the hydrophilic and/or lipophilic groups on the surface of the nanoparticles (i.e., from the polysiloxane) can interact with a compatible target chemical that is contacted with the MNSS material in a fluid (i.e., liquid) medium (e.g., in a bioprocess stream), so that the target chemical is sorbed onto the surface of the nanoparticles to form a MNSS-target compound complex. The complex can be separated from the bulk fluid by a variety of processes, including magnetic and flotation techniques. Once the complex has been separated from the bulk fluid, the target organic material can be desorbed from the surface of the nanoparticles for recovery and subsequent use or further processing.

Preferably, the superparamagnetic nanoparticles and non-magnetic nanoparticles, when present, are substantially spherical. In some preferred embodiments, the cores of the superparamagnetic nanoparticles comprise Fe, Co, or a combination thereof (e.g., $Fe_2Co$). Preferably, the superparamagnetic nanoparticles have a mean diameter of about 0.5 nm to about 100 nm, more preferably about 2 nm to about 50 nm. The non-magnetic nanoparticles preferably have a mean diameter of about 2 nm to about 50 nm. The non-magnetic nanoparticles preferably comprise at least one metal oxide, such as titania, alumina, ceria, zirconia, silica, and the like. As used herein, the term metal oxide is meant to encompass oxides of transition metals, main-group metals, lanthanides, actinides, and metalloids (e.g., Si).

The nanoparticles of the MNSS are tethered together by molecular chains (preferably substantially linear chains) comprising a hydrocarbon chain and/or a poly(alkylene oxide) chain (also sometimes referred to as a poly(oxyalkylene) chain). The molecular chains tethering the nanoparticles are covalently attached to the nanoparticles or the polysiloxane sorption-aiding substituents on the surface of the nanoparticles, and effectively deploy the nanoparticles in a flexible three-dimensional array or network. In some embodiments, each end of the tethering chain is bonded to a metal oxide on the surface of a nanoparticle or to the polysiloxane through a silicon-to-oxygen bond. Such bonding can be achieved by reacting the passivated superparamagnetic nanoparticles and non-magnetic nanoparticles, when present, with a difunctional-coupling agent that includes reactive groups at the ends of the molecular chains that can react, e.g., with a metal oxide or the polysiloxane on the surface of the nanoparticles. One convenient and useful type of reactive group is a trialkoxysilyl group, where the silicon is directly bonded to the end of a hydrocarbon chain or a poly(oxyalkylene) chain. One or more of the alkoxy substituents is displaced by a hydroxyl group in the surface proximity of the nanoparticles to form a silicon-to-oxygen bond, thus anchoring the tether to the nanoparticle. As used herein, reaction of a hydroxyl group or other reactive functional group "in the surface proximity" refers to reactions (e.g., coupling or polymerization) that occur on or around the surface of the nanoparticles. The polysiloxane and the tethering chains do not need to be covalently bonded to the surface of the nanoparticles for tethering or surface functionalization to occur. During formation of the MNSS network the siloxane monomers and tethering groups surround the surface of the nanoparticles (e.g., like a net). The monomers polymerize around the nanoparticles and the tethering groups typically bond with a hydroxyl group or other reactive group of the polysiloxane. The net result is that the particles are tethered together, even though there may not be any covalent bond the nanoparticle surface.

In some embodiments, the surface proximity of at least some of the nanoparticles comprises a polysiloxane bearing sorption-aiding hydrophilic groups that are capable of interacting with sugars or other organic target compounds. Such hydrophilic groups are utilized to sorb hydrophilic target compounds, such as sugars, polyols, organic acids, and the like, from a liquid medium such as a bioprocess stream. In other embodiments, the surface proximity of at least some of the nanoparticles comprises a polysiloxane bearing sorption-aiding lipophilic groups (i.e., hydrophobic groups capable of interacting with lipids, hydrocarbons, and the like). Such lipophilic groups are utilized to sorb lipids, hydrocarbons, terpenes, and the like from a liquid medium such as a bioprocess stream.

In yet other embodiments, the surface proximity of at least some of the nanoparticles comprises a polymerized siloxane or a combination of siloxanes bearing hydrophilic groups and lipophilic groups. Such materials allow the surface hydrophilicity/lipophilicity to be tailored for particular target molecules. In cases where the polysiloxane includes more than one type of hydrophilic and/or lipophilic group, the different sorption-aiding groups can be derived from the same monomer or from different monomers.

Also described herein is a method of separating a target organic compound from a liquid medium (e.g., an aqueous or non-aqueous liquid). The method comprises the steps of contacting a liquid containing the target organic compound with an MNSS material as described herein for a time sufficient to sorb at least a portion of the target organic compound from the liquid, forming, e.g., a "complex", and separating the complex (i.e., MNSS material with the adsorbed target organic compound) from the liquid. In some embodiments, the liquid contains less than 15 wt % of the target organic compound prior to contacting with the MNSS material. The separation can be effected magnetically, e.g., by magnetocollection, magnetoflocculation, or magnetoanisotropic sorting; or can be effected by other means, such as flotation. Optionally, the method can include the additional step of recovering the target organic compound from the MNSS complex following the separating step. For example, the MNSS complex can be removed to another compartment, vessel or unit operation, e.g. by skimming, pumping, etc. (this removal is referred to herein as "elution"), and the complex can be subjected to one or more of the following concentration processes: magnetostriction, pH shock, thermal shock, mechanical deformation, or solvent extraction to desorb the target compound. Alternatively, subsequent to elution, the complex can be injected into a reaction medium (e.g., containing enzymes and/or other reagents) of significantly smaller volume than the original liquid to induce specific chemical reactions in the separation compartment.

In another aspect, a method of preparing a MNSS material is provided. The method comprises forming a mixture comprising nanoparticles, a coupling agent, a polymerizable siloxane monomer (e.g., a single monomer or a combination of monomers), and optionally a solvent, in relative quantities sufficient for the coupling agent to tether the nanoparticles to a selected degree of junction functionality of about 2.1 to about 6, and for the siloxane monomer to form a polysiloxane in the surface proximity of the nanoparticles; heating the mixture to enable the coupling agent to tether the nanoparticles together and to enable the siloxane monomer to polymerize in surface proximity of the nanoparticles thereby forming the particulate MNSS material; and optionally removing any volatile by-products or solvent from the MNSS mixture. As described elsewhere herein, the nanoparticles comprise superparamagnetic nanoparticles or a combination of superparamagnetic and non-magnetic nanoparticles. Each superparamagnetic nanoparticle comprises a passivating metal oxide coating around a metallic nanocrystalline core, and the non-magnetic nanoparticles preferably comprise a metal oxide (e.g., the same metal oxide as the passivating coating or a different metal oxide). The cores of the superparamagnetic nanoparticles comprise at least one a metal or alloy having ferromagnetic or ferrimagnetic properties. The coupling agent comprises a substantially linear hydrocarbon chain, poly(alkylene oxide) chain, or a combination thereof, in which the ends the chain include functional groups capable of covalently reacting with the nanoparticles or with the polysiloxane, e.g., with a metal oxide or a reactive polysiloxane functional group. The polymerizable siloxane monomer can comprise a single monomer or a combination of monomers that collectively bear one or more hydrophilic groups, lipophilic groups, or a combination of hydrophilic and lipophilic groups.

MNSS materials that selectively capture sugars, lipids, hydrocarbons, or other organics (e.g., carboxylic acids, aromatic compounds, etc.) extend the use of magnetic fields in separation processes by resolving process barriers that have long been associated with the use of solid sorbents, e.g., separation of sorbents from heterogeneous process streams, long separation times and expense generally required to collect a solid sorbent from a liquid mixture, and organic product delivery for conversion. These problems are only exacerbated as particles approach nanometer dimensions by the inherently large surface area required for efficient organic sorption.

The MNSS materials described herein address the shortcomings of the existing art and provide additional advantages due, at least in part, to the elastic network of tethered nanoparticles, and the functionalized polymer coatings in the surface proximity of the nanoparticle junctions of the networks, which impart selectable physical properties (e.g., flexibility, glass transition temperature, etc.) and chemical properties (e.g., desirable polymer-product enthalpic interactions, or solubility), to sorb targeted organic material from a process stream, further enable separation from the process stream, or enable desorption of sorbed species. The large surface area of the nanoparticles must be functionalized to enable the economic advantages they impart to be realized. In addition, the tethering of the nanoparticles provide MNSS particle diameters suitable to afford sufficient collective magnetization to enable the MNSS to be removed from a reaction mixture by the application of a magnetic field of effective strength to influence the mobility of the MNSS-organic product complex in the mixture. The tethers also provide for spacing between the nanoparticles to better accommodate permeation of the target molecule into the particles of the MNSS and to allow the superparamagnetic nanoparticles to freely orient in an applied external magnetic field of sufficient strength to induce a net magnetization in the nanoparticles. The average MNSS particle diameter is the range of about 0.1 to 1,000 microns, but preferably about 1 to 500 microns, or more preferably about 50 to 300 microns.

The superparamagnetic nanoparticles are synthesized using colloidal techniques, or other techniques known to those skilled in the art, and coated with a metal oxide material to chemically passivate the particles. Superparamagnetic particles do not display permanent magnetism. Permanent magnetism after a magnetic field is switched off would lead to aggregation by mutual interaction between the particles. The use of superparamagnetic particles avoids this undesirable aggregation. As discussed elsewhere herein, the particle size of the nanoparticles is 100 nm or less, preferably 50 nm or less, to achieve suitable superparamagnetic behavior, which is characterized by single domain structures.

The tethering of the nanoparticles into a network affords advantages, structural features, and properties not found in the prior art relating to superparamagnetic nanoparticles. For example, the tethering chains link the nanoparticles in a manner that enables the magnetic nanoparticles to orient freely in an applied magnetic field without clustering together to form a permanent magnetic moment. In addition, the elastic, expanded nature of the network provides porosity which allows the target organic compound to permeate the MNSS particles and interact with the functional groups on the surface of the nanoparticles to facilitate sorption of the targeted organic product. The surface functionalization can be tailored to affect the desired degree and selectivity of organic target compound sorption from a liquid, such as a process stream, and to further enable separation of the target compound from the process stream, and/or enable desorption of sorbed target compound subsequent to elution.

The particulate MNSS material is added to the aqueous fluid (process steam) in a quantity effective to enable a specific degree of organic product sorption from the fluid, e.g., capture of sugar from the biomass hydrolysate.

DETAILED DESCRIPTION OF THE INVENTION

Figure 1:
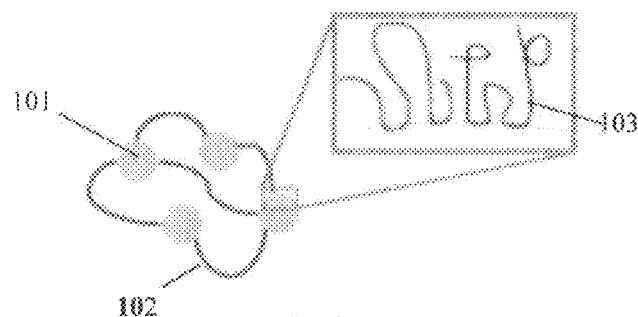
FIG. 1 schematically illustrates an exemplary depiction of an MNSS material including discrete, surface functionalized nanoparticles tethered together as described herein.

The term "superparamagnetic" and grammatical variations thereof refers to a form of magnetism that appears in ferromagnetic or ferrimagnetic nanoparticles (generally less than 50 nm. e.g., about 3 to 50 nm, depending on the material) that have a single magnetic domain. In the absence of an external magnetic field, the magnetization of each nanoparticle randomly flips direction in response to thermal energy (temperature). The period of time between flips is referred to as the Néel relaxation time. In the absence of an external magnetic field the magnetization of a superparamagnetic nanoparticle is zero when the magnetization is measured over a time period significantly longer than the Néel relaxation time. In the presence of an external magnetic field, the nanoparticles magnetize to create a single large magnetic moment (the sum of all the individual magnetic moments carried by the atoms of the nanoparticle align).

The term "sorption" refers to a physical and/or chemical process driven by favorable enthalpy, by which one substance becomes attached to another, i.e., absorption (the incorporation of a substance in one state into another of a different state) and adsorption (the physical adherence or bonding of ions and molecules onto the surface of another phase) are considered as a single process.

The term "junction functionality" refers to the average number of chains per cross-linking junction in polymeric network. In the context of the present invention, "junction functionality" refers to the average number of tethering chains (e.g., hydrocarbon or poly(alkylene oxide) chains) attached to each nanoparticle in a magnetic nanostructured solid sorbent (MNSS) material.

The term "substantially linear" as used herein in reference to a tethering chain refers to a contiguous chain of at least eight (8) atoms between the reactive groups attaching the chains to the nanoparticle surface. The term "substantially linear" encompasses linear hydrocarbon chains of the form —$CH_2$—$(CH_2)_n$—$CH_2$— for n equal to at least 6 (e.g., 6 to 20), as well as hydrocarbon chains of the form —$CH_2$—$(CH_2)_n$—$CH_2$— in which one or more of the hydrogen atoms of a methylene group is replaces by a short alkyl substituent such as methyl, ethyl, or propyl. Similarly, the term "substantially linear", when used in reference to a poly(alkylene oxide) chain encompasses poly(ethylene oxide) materials as well as materials comprising polypropylene oxide, and/or polybutylene oxide monomer units, i.e., which include pendant methyl and ethyl substituents, respectively along the principal polymer chain. Preferably, the tethering chains are composed of linear hydrocarbon chains of the form: —$CH_2$—$(CH_2)_n$—$CH_2$—, poly(ethylene oxide) chains (preferably including an average of at least 3 oxyethylene monomer units in the chain; e.g., 3 to 12), or a combination of linear hydrocarbon and poly(ethylene oxide) groups of the form: —R—O—$(CH_2CH_2O$—$)_m$—R—, in which m has an average value of at least 2 (e.g., 2 to 10) and each R is —$(CH_2)_p$— in which p is an integer from 1 to 8 (preferably 1, 2, or 3). The poly(alkylene oxide) chains of the coupling agent can comprise molecules of substantially a single chain length (i.e., m=an integer), or the poly(alkylene oxide) chains of the coupling agent can comprise a mixture of molecules of different chain lengths, with the average chain length being equal to m (i.e., m is not an integer).

MNSS materials, methods for making the same, and processes exploiting the separation/concentration attributes of the same are described herein. A detailed discussion of certain examples of the MNSS materials and methods are presented below for purposes of illustration.

FIG. 1 schematically illustrates an example of an MNSS particle as described herein. MNSS particle 100 comprises a plurality of substantially spherical nanoparticles 101 tethered together by a plurality of chains 102 covalently bound to, or around, the nanoparticles to form an elastomer network, where the magnetic nanoparticles are network junctions. The surface of at least some of nanoparticles 101 comprises a coating 103 of a functionalized polysiloxane, which includes hydrophilic and/or lipophilic substituents. At least some of some of nanoparticles 101 are superparamagnetic. Optionally, some of nanoparticles 101 can be non-magnetic nanoparticles. In use, the particulate MNSS material is contacted with a liquid medium containing a target organic compound such as a sugar, lipid or hydrocarbon, to form a MNSS-target compound complex. Since the MNSS particles are insoluble, the resulting complex can be separated from the liquid medium to recover or isolate the target compound.

Non-magnetic nanoparticles can be incorporated into the MNSS material to provide additional features, such as the ability to separate the MNSS-target compound complex from the liquid medium by flotation, to desorb the target compound from the MNSS-target compound complex, e.g., by species by magnetostriction, pH shock, thermal shock, or solvent extraction, or to provide increased mechanical strength or elasticity, e.g., to facilitate mechanical modes of desorption of sorbed target compound.

The sorption properties of the MNSS network depend on the number of factors, including, e.g., the density of functional side chains attached to the polysiloxane on the surface of the nanoparticles, the length/size of the tethering of the chains between the nanoparticles, the density of the nanoparticle network junctions, and the chemical nature of the chains (hydrophilic, lipophilic, or both).

The cores of the superparamagnetic nanoparticles can be composed of any metal or alloy capable of exhibiting ferromagnetic or ferrimagnetic properties and superparamagnetism, such as, e.g., iron, cobalt, and an iron cobalt alloy such as $Fe_2Co$. Preferably, the non-magnetic nanoparticles comprise or are composed of a metal oxide, such as aluminum oxide, titanium oxide, zinc oxide, or iron oxide.

Illustrative, substantially spherical iron nanoparticles that are about 30 to 40 nm in diameter can be synthesized from iron chloride by polyol reduction at 130° C. in ethylene glycol using sodium hydroxide reduction mediation following procedures known to those skilled in the art (see D. Kodama et al., *J. Mag. Mag. Mater.* 2007; 310:2393-2395). The particle size, crystallinity, and single crystalline (or magnetic) domain structure can be confirmed by transmission electron microscopy (TEM), high resolution TEM (HRTEM), X-ray dispersion (XRD) analysis, and the like. The magnetic properties of the nanoparticles can be characterized using a superconducting quantum interference device (SQUID). To prevent permanent ferromagnetic behavior, the iron surface must be passivated, e.g., with a metal oxide coating such as a silica or alumina coating. The measured magnetization of iron nanoparticles prepared using these methods should compare favorably with the bulk value of iron (220 emu/g).

The superparamagnetic nanoparticle cores can be passivated by a number of methods, such as colloidal precipitation and atomic Layer Deposition (ALD) techniques known to those skilled in the art (see e.g., M. Ritala, and M. Leskela, *Atomic Layer Deposition*, in *Handbook of Thin Film Materials*, H. S. Nalwa, Editor, 2001. Academic Press: San Diego. p. 103; and A. C. Dillon et al., "Surface Chemistry of $Al_2O_3$ Deposition Using TMA and $H_2O$ in a Binary Reaction Sequence," *Surface Science*, 1995; 322:230-242) to render the metallic nanoparticles stable in bioprocess environments and to prevent undesirable permanent magnetic behavior. The thickness of the passivation layer should be sufficient to render the metallic nanoparticles chemically stable in the environment in which the particles will be used, and to provide for repeated recycling of the MNSS in a separation process to gain economic advantage over existing biomolecule separation processes. Typically, the passivation layer will have a thickness in the range of about 5 to about 40 nm. Selection of a suitable thickness for the passivation layer is a routine matter within the capabilities of a person having ordinary skill in the art or nanomaterial preparation.

The nanoparticles are tethered together to form a network using coupling agents comprising substantially linear hydrocarbon and/or poly(alkylene oxide) chains with pendent reactive groups at each end of the chain, which can covalently react with the metal oxide or the polysiloxane on the surface of the nanoparticles forming an elastic network in which the nanoparticles are the network junctions and the tethering chains connect the junctions. Preferably, the network has junction functionality in the range of about 2.1 to about 6. The reactive pendent groups can be any groups capable of reacting with the surface of the nanoparticles or the polysiloxane on the surface of the nanoparticles (e.g. with the metal oxide or sorption-aiding functional substituents of the polysiloxane present at the surface). Conveniently and preferably, the reactive groups comprise trichloro-substituted or trialkoxy-substituted silyl groups in which the silicon is attached to the tethering chain and one or more of the chloro or alkoxy group can be displaced by an oxygen in the proximity of the metal or metal oxide surface, or the polysiloxane in the surface proximity of the nanoparticles to form a silicon-to-oxygen bond, thus anchoring the particle to the tethering chain. Alternatively, the pendent groups of the coupling agent can comprise other reactive groups, such as amino, azido, hydroxyl, and glycidoxy. The molecular size of the linear hydrocarbon or poly(alkylene oxide) chains employed to tether the nanoparticles together is selected, e.g., to enable the magnetic nanoparticles to orient freely in an applied magnetic field and to provide sorption of the targeted organic product.

The surfaces of the nanoparticle junctions are functionalized with hydrophilic and/or lipophilic groups to enable sorption of target organic compounds, further enable separation from the process stream, and/or enable desorption of sorbed compounds. The nanoparticle surfaces are functionalized by a polysiloxane disposed in the surface proximity of the nanoparticles, e.g., by polymerization of a functionalized siloxane monomer or monomers at the surface proximity of the nanoparticles. The monomers from which the polysiloxane is formed include the hydrophilic and/or lipophilic groups as side chains. The side chains can include groups such as, for example, amino, aminophenoxy, benzoyloxy, alkyl (e.g., methyl, ethyl, hexyl, cyclohexyl, octyl, dodecyl, octadecyl), gluconamide, glycidoxy, hydroxyl, mercapto, methacryloxy, fluoro, aryl (e.g., phenyl), maleamate, phosphonate, a carboxylic anhydride (e.g., succinic anhydride), suitably attached to the polysiloxane. In some embodiments, siloxane monomers can have the formula $(X^1)_x Si(R^1)_{4-x}$ in which x is 1, 2 or 3 (preferably 2), $X^1$ is chloro or $OR^2$, and the $R^1$ groups are the hydrophilic and/or lipophilic substituents of the polysiloxane. The chloro and $OR^2$ groups are hydrolyzable to form unstable silanol groups, which than condense to form a polysiloxane backbone, which optionally can be covalently bonded at the surface proximity of the nanoparticles. Preferably, each $R^2$ is alkyl (e.g., methyl or ethyl), and each $R^1$ independently is selected from the group consisting of amino, hydroxyl, mercapto, alkoxy, alkyl (e.g. a $C_1$-$C_{22}$ alkyl such as methyl, ethyl, propyl, butyl, hexyl, decyl, dodecyl, octadecyl, which can saturated or unsaturated), cycloalkyl (e.g., cyclohexyl), aryl (e.g., phenyl) and heteroaryl (e.g., pyridyl), in which the alkyl, cycloalkyl, aryl, and heteroaryl groups can be unsubstituted, or can be substituted with one or more suitable substituent, such as alkyl, cycloalkyl, aryl, heteroaryl, amino, hydroxyl, mercapto, alkoxy, a carboxylic acid, a phosphonic acid, a sulfonic acid, a carboxylic ester, a carboxylic amide, a carboxylic anhydride, a saccharide (sugar), a halogen (e.g., F, Cl, Br) or a salt of such groups that may be ionizable. In some preferred embodiments, siloxane monomers can be dicyclohexyl, diethyl, dimethyl, or diphenyl siloxane monomers. Mixed side chain chemistries can be employed to affect the desired degree and selectivity of the target organic compound sorption from a process stream, and/or enable desorption the targeted organic products to effect concentration.

The degree of nanoparticle functionalization achievable in a given case is directly related to the nanoparticle surface area, or the nanoparticle size and morphology. The surface functionalization formed by a heterogeneous polymerization reaction in the "particle surface proximity". The preferred method of tethering and surface functionalizing the nanoparticles comprises mixing the nanoparticles with bi-functional coupling agents and surface functionalization siloxane monomers and reacting the mixture under conditions (e.g., temperature, environment (e.g., neat or in a suitable solvent), and reaction time) that are effective for the coupling agent to tether the nanoparticles together forming the MNSS network, and the siloxane to polymerize at the surface proximity of the nanoparticles. Volatile by-products may be driven off as the MNSS mixture is heated. The nanoparticles, coupling agents, and surface functionalization monomers are added in quantities effective to enable a specific separation. The selection of suitable coupling agents, monomers, reactions conditions, and the like is within the capabilities of a person having ordinary skill in the chemical arts.

Figure 2:
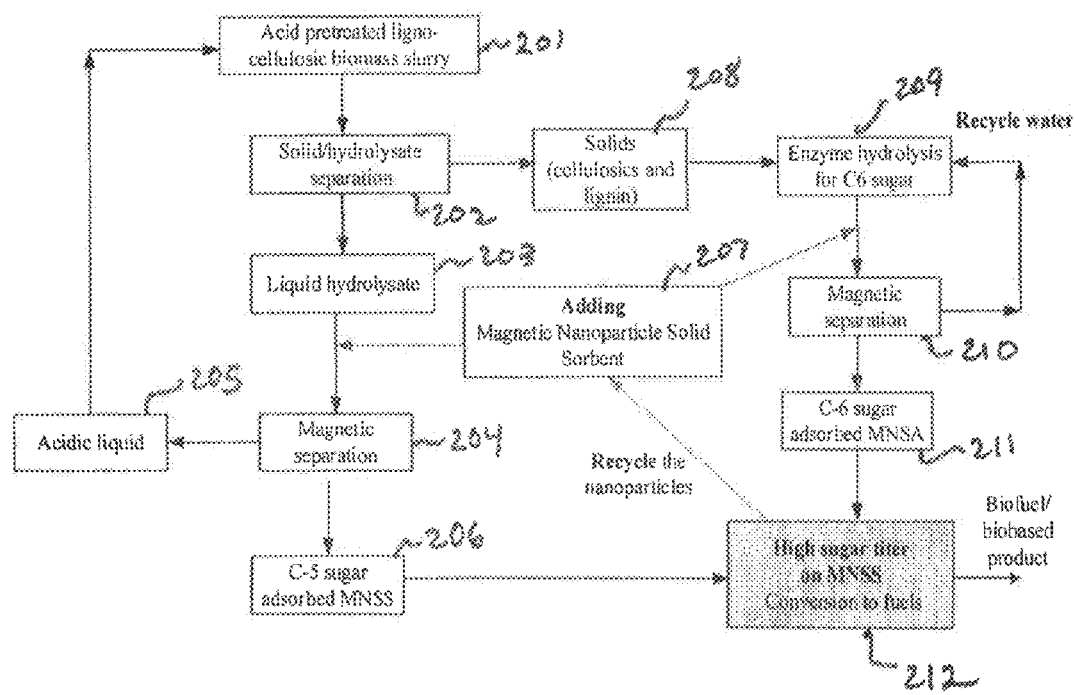
FIG. 2 provides an exemplary depiction of a process flow diagram for the separation and concentration of sugars produced by the hydrolysis of a biomass feedstock.

An exemplary process flow diagram is provided in FIG. 2 to illustrate the separation and concentration of sugars produced by the hydrolysis of biomass feedstocks. The superparamagnetic properties of the MNSS material can be utilized to facilitate recovery of a MNSS-sugar complex by magnetic separation. The term "magnetic separation" as used herein refers to a process that uses a magnetic solid and an externally magnetic field to separate materials or compounds. Examples of magnetic separation include, e.g., magnetocollection, magnetoflocculation, and magnetoanisotropic sorting. The MNSS material is introduced into a biomass hydrolysate medium, and sugars in the medium are sorbed by the MNSS to form a MNSS-sugar complex. The complex can be magnetically separated and/or separated by flotation from the hydrolysate medium, moved (eluted) to another compartment, vessel or unit operation such as by skimming or pumping, and then concentrated, e.g., by magnetostriction, pH or thermally-induced desorption, mechanical modes of desorption, solvent extraction to desorb the target compound. Subsequent to elution, the complex optionally can be introduced into a reaction medium (e.g., containing enzymes or other reagents) of significantly smaller volume than the volume of liquid from which the complex was eluted to begin subsequent processing, such as fermentation or catalytic conversion. The sugar can be separated from the MNSS-sugar complex during the concentration process, if desired, so the MNSS can be recycled into the biomass-processing environment to separate additional target sugar.

In the process described in FIG. 2, an acid-pretreated lignocellulosic biomass slurry 201 is subjected to solid/liquid separation 202 to form a liquid hydrolysate 203. A particulate MNSS material 207 with hydrophilic surface functionality compatible with the target sugar is added to liquid hydrolysate 203, where the target sugar is sorbed by the MNSS material 207. The resulting mixture is subjected to magnetic separation 204 to separate a MNSS-C5 sugar complex 206 from the residual acidic hydrolysate medium 205, which can be recycled into slurry 201. After separation 202, the solids (cellulosic and lignin) 208 can be subjected to enzyme hydrolysis 209 to form C6 sugar. The C6 sugar can also be treated with MNSS 207 and subjected to magnetic separation 210 to form a MNSS-C6 sugar complex 211. Complexes 206 and 211 can be separated from the MNSS to form a high titer sugar solution 212, which can be converted to other materials (e.g., a biofuel), as desired.

The small size of the MNSS-sugar complexes (micro-sized particles) enable the complexes to be dispersed in an aqueous or liquid phase and treated with homogeneous or heterogeneous catalysts to produce valuable products. Therefore, the MNSS materials descried herein can be used not only to capture targeted organic compounds (e.g., sugars) from a process stream, but also to resolve process barriers long associated with the use of solid absorbents, such as the continuous separation of absorbents from solid/liquid process streams, long separation times and expense generally required to collect a solid sorbent from a liquid mixture, and organic product delivery for conversion. In addition, the energy requirements for magnetic fields used in the separation process are minimal, and thus should not significantly offset cost savings from the other benefits.

Direct capture of sugar molecules from the aqueous phase of a biomass hydrolysate using an MNSS material as described herein can significantly simplify the overall biomass conversion process at the pretreatment stage and significantly reduce energy and processing costs. The captured sugar can be made available at very high titers for conversion to biofuels, bio-based products, or biochemicals.

This technology is not limited to the direct capture of cellulosic sugars from pretreatment hydrolysate, but is generally applicable to any process with a low titer organic product, and could significantly reduce down-stream product separation cost and save energy. Examples of other such products include, e.g., organic acids, lipids, and hydrocarbons.

Comparative Example

Sugar Sorption on Ion-Exchange Beads

Commercial adsorbents based on silicon/titania/alumina metal oxide particles and polymer beads form the basis of industrial ionic-separation processes. Specifically, chemically-functionalized poly(styrene-co-divinylbenzene) ion-exchange resin beads are tailored to absorb glucose and xylose. The sugar-capture efficiencies of these commercial ion-exchange beads were evaluated as a basis for comparison with the MNSS materials described herein. Results of these evaluations are provided in Table 1. DOWEX L-493, AMBERLITE XAD-2, and XAD-4 are non-ionic beads, DOWEX 1X8-400 and PUROLITE A-500P are anionic beads, and DOWEX 99CA/320 and PUROLITE MN-500 are cationic beads. DOWEX L-493 has the highest sugar sorption capacity and the highest surface area (1100 $m^2/g$). Values in Table 1 represent averages of 2 to 6 replicate experiments.

Sugar capture was quantified in single-pass sorption column experiments and expressed as mass % sugar sorbed per mass of commercial polymer. Saturation capacity was achieved at low residence time. Less than 40% and 45% of glucose and xylose was captured, respectively, yielding extraction ratios of 0.658 and 0.804 for DOWEX L-493.

TABLE 1

| Sugar Capture Efficiency of Commercial Polymers | | |
|---|---|---|
| Sample | Glucose Uptake | Xylose Uptake |
| 1X8-400 (800 $m^2/g$) | 3.82% | 3.24% |
| A-500P | 5.60% | 5.08% |
| 99CA/320 | 4.07% | 3.80% |
| MN-500 (900 $m^2/g$) | 5.69% | 5.31% |
| L-493 (1000 $m^2/g$) | 8.69% | 8.20% |
| XAD-4 (750 $m^2/g$) | 6.73% | 5.98% |
| XAD-2 (300 $m^2/g$) | 4.48% | 4.42% |

Example 1

Superparamagnetic Nanocrystalline Particle (SNP) Synthesis

Iron Nanocrystalline Particles—Colloidal Synthesis Via Polyol Reduction

Substantially spherical, nanocrystalline superparamagnetic iron (Fe) particles (30 to 40 nm in diameter) were synthesized from iron chloride ($FeCl_2$, 3 mmol) by polyol reduction at about 200° C. in 1,2-butanediol (BD), using sodium hydroxide (NaOH; 15 mmol) reduction mediation. The particle size and crystallinity of the Fe nanoparticles were confirmed by TEM, HRTEM and XRD analysis. Magnetic characterization was conducted using a superconducting quantum interference device (SQUID). The measured magnetization of Fe nanoparticles was 240 emu/g, which compares favorably with the bulk value for Fe (220 emu/g).

Iron Cobalt Nanocrystalline Particles—Colloidal Synthesis Via Metal Carbonyl Decomposition Substantially spherical, nanocrystalline superparamagnetic iron cobalt alloy ($Fe_2Co$) particles (approximately 10 to 20 nm in diameter) were synthesized by metal carbonyl decomposition at 200° C. In a typical synthesis, 1.5 mmol of hexadecylamine hydrochloride (HDA.HCl) and 20 mL of benzyl ether (BE) were mixed and degassed at room temperature for 30 minutes under a flow of Argon (Ar) with stirring. Trioctylphosphine (TOP, 1.5 mmol) was then added to the degassed solution, and the reaction mixture was heated to 120° C., degassed for an additional 30 minutes to dissolve HDA.HCl, and then heated to 200° C. Concurrently, 0.5 mmol of cobalt carbonyl ($Co_2CO_8$) was dissolved in 4 mL of octyl ether at 45° C. under Ar with stirring. $Fe(CO)_5$ (6 mmol) was added to the $Co_2CO_8$-octyl ether solution, mixed well, and then added to the 200° C. TOP/HDA.HCl reaction solution under Ar. The reaction solution was maintained at 200° C. for 30 minutes, and then cooled to room temperature.

Fe$_2$Co nanoparticles were harvested from the cooled reaction solution with a magnet, washed with a hexane/ethanol mixture, and stored in hexane. The particle size and crystallinity of the recovered Fe$_2$Co nanoparticles were confirmed by TEM, HRTEM and XRD analysis. Energy dispersive spectra (EDS) were taken over several areas of the nanoparticles on a TEM grid, demonstrating a consistent Fe-to-Co atomic ratio of approximately 2-to-1. The X-ray diffraction (XRD) pattern of the nanoparticles exhibited a bcc crystal phase.

Iron Cobalt Nanocrystalline Particles—Colloidal Synthesis Via Polyol Reduction

Substantially spherical, nanocrystalline superparamagnetic Fe$_2$Co alloy particles (10 to 20 nm in diameter) were synthesized from iron chloride (FeCl$_2$; 0.2 mmol) and cobalt acetate tetrahydrate (Co(Ac)$_2$.H$_2$O; 0.1 mmol) by polyol reduction at 130° C. in ethylene glycol (EG) using sodium hydroxide (NaOH, 12 mmol) reduction mediation, and chloroplatinic acid (H$_2$PtCl$_6$.6H$_2$O; 2.4×10$^{-5}$ mol) as a reducing catalyst. The particle size and crystallinity of the nanocrystalline Fe$_2$Co alloy particles were confirmed by TEM, HRTEM and XRD analysis.

Iron Cobalt Nanocrystalline Particles—Solid-State Synthesis and Thermal Reduction High aspect ratio nanocrystalline Fe$_2$Co alloy fibers are produced by electrospinning, followed by thermal oxidization and thermal reduction. Thermal reduction in forming gas produces metal or metal alloy nanofibers. The metal oxide state is extremely friable, and ball milling the metal oxide fibers prior to thermal reduction converts the fibers into substantially spherical nanocrystalline superparamagnetic particles of approximately 30 to 50 nm in size subsequent to thermal reduction. The particle size and crystallinity of the Fe$_2$Co alloy nanoparticles were confirmed by BET, TEM, HRTEM and XRD analysis. Magnetic characterization was conducted using a SQUID device. The measured magnetization of the Fe$_2$Co nanoparticles was 190 emu/g.

Magnetic Nanocrystalline Particle Surface Passivation

The superparamagnetic nanoparticle surfaces can be passivated by colloidal methods using IGEPAL CO 520 emulsifier and coupling agent (chemical name, nonyl phenol ethylate (5 moles EO), CAS Number: 68412-54-4, manufactured by Rhodia) followed by reaction with tetraethylorthosilicate (TEOS) under basic conditions (pH approximately 9) to form a coating of colloidal silica on the surface of the metal nanoparticles. The degree of nanoparticle passivation imparted by the colloidal method is directly related, e.g., to the nanoparticle surface area, the quantity of nanoparticles, and the passivation material. For example, to passivate 85% of the surface area of a plurality of nanoparticles, with a surface area of 23 m$^2$/g, approximately 0.01446 moles of the passivation agent (i.e., tetraethylorthosilicate) per 100 g of nanoparticles is required. The passivated nanoparticles are separated from the synthesis solution and washed to remove unreacted ingredients. Care must be taken not to passivate the magnetic nanoparticles at too high a concentration to prevent aggregate formation. Metal nanoparticles must be passivated to prevent undesired reaction with the process environment (e.g., oxidation) and to enable repeated process cycling of the MNSS.

The superparamagnetic nanoparticles also can be passivated using Atomic Layer Deposition (ALD) techniques (see e.g., M. Ritala, and M. Leskela, *Atomic Layer Deposition*, in *Handbook of Thin Film Materials*, H. S. Nalwa, Editor, (2001) Academic Press: San Diego. p. 103; A. C. Dillon, A. W. Ott, J. D. Way, and S. M. George, "Surface Chemistry of Al$_2$O$_3$ Deposition Using TMA and H$_2$O in a Binary Reaction Sequence," Surface Science (1995) 322, p. 230-242). Advantage can be taken of ALD passivation of the magnetic nanoparticles of the invention under solventless process conditions to render the metallic nanoparticles stable in a bioprocessing environment.

The thickness of the passivation layer is not limited, but should be sufficient to render the metallic nanoparticles chemically stable and provide for repeated recycling of the MNSS in process to gain economic advantage over existing bioprocess separation processes. Typically, passivation layers have a thickness of about 5 to about 40 nm, preferably about 15 nm.

Example 2

MNSS Synthesis

MNSSs are synthesized in two concurrent chemical processes: (1) the passivated magnetic nanoparticles are tethered together with non-magnetic nanoparticles as a network to form larger MNSS particles, and (2) and the surface of the individual nanoparticle junctions of the network are functionalized to enable sorption of targeted organic products, further enable separation from the process stream, and/or enable desorption of sorbed species.

Network Formation

As described elsewhere herein, passivated magnetic and non-magnetic nanoparticles preferably are tethered together to form a network using coupling agents comprised of substantially linear hydrocarbon or poly(alkylene oxide) chains (e.g., poly(methylene oxide), poly(propylene oxide), or poly (butylene oxide) chains) with a pendent reactive group at each end of the chains, such that each reactive group can bind with a nanoparticle surface, or the polysiloxane sorption-aiding substituents on the surface or in the surface proximity of a different nanoparticle. The various nanoparticles, in essence, become the junctions connecting the organic chains in a three-dimensional network. The reactive pendent groups Non-limiting examples of certain preferred bi-functional coupling agents include, e.g., 1,8-bis(triethoxysilyl)octane, i.e.: (EtO)$_3$Si—CH$_2$(CH$_2$)$_6$CH$_2$—Si(OEt)$_3$, and bis(3-triethoxysilylpropyl)poly(ethylene oxide); i.e.: (EtO)$_3$Si—CH$_2$CH$_2$CH$_2$—O—(CH$_2$CH$_2$O)$_m$—CH$_2$CH$_2$CH$_2$—Si (OEt)$_3$, where m preferably has an average value of about 2 to about 10.

Elastic networks preferably are formed with junction functionalities of about 2.1 to about 6, e.g., about 2.2 to about 4, or about 2.3 to about 3. Advantage can be taken of the superparamagnetic properties of the magnetic particles by selecting the molecular weight of the linear hydrocarbons employed to tether the nanoparticles together to enable the magnetic nanoparticles to orient freely in an applied magnetic field and to provide sorption of the targeted organic product.

Nanoparticle Surface Functionalization

As described elsewhere herein, the surfaces of the magnetic and non-magnetic nanoparticles are chemically functionalized to enable sorption of targeted organic products, further enable separation from the process stream, and/or enable desorption of sorbed species. The chemistry of the surface functionalization is not limited and preferably comprises polymerized siloxane chains (polysiloxanes) that include with one or more pendent hydrophilic, hydrophobic, and/or lipophilic side chains. Sorption is enabled by forming desirable enthalpic interactions between the targeted organic compounds (e.g., sugars, carboxylic acids, lipids, hydrocarbons) present in a process stream and the nanoparticle surface functionality on the nanoparticles, and may be enhanced by including multiple types of pendent side chains on the nanoparticles surfaces. Separation from the process stream can be effected, for example, by flotation mechanisms, which are enabled by hydrophobic surface functionalities, and or my magnetic separation methods. Desorption of sorbed species can be effected, for example, by processes such as magnetostriction, pH and/or thermal shock, solvent extraction, and increased mechanical strength or elasticity, to enable mechanical modes of desorption. The mechanical properties of the network depend on the number of polymer chains attached in the proximity of the nanoparticle surface, the molecular weight of the polymer chains tethering the junctions together, and the density of the network junctions (see, e.g., Brotzman, R. W., Flory, P. J. "The Elastic Behavior of Cis-1,4-Polybutadiene" *Macromolecules*, 1987, 20:351-356; Brotzman, R. W. "The Elastic Behavior of Cis-1.4 Polybutadiene," in *Advances in Elastomers and Rubber Elasticity*, 1986, ACS Symposium Series, Plenum, 361-377; Brotzman, R. W., Mark, J. E. "Examination of the Critical Parameters in the Constrained Junction Theory of Rubber Elasticity," *Macromolecules*. 1986, 19:667-675; Brotzman, R. W., Eichinger, B. E. "Swelling of Model Poly(dimethylsiloxane) Networks," *Macromolecules*, 1983, 16:1131-1136; Brotzman, R. W., Eichinger, B. E. "Volume Dependence of the Elastic Equation of State. 3. Bulk Cured Poly(dimethylsiloxane)," *Macromolecules*, 1982, 15, 531-535; Brotzman, R. W., Eichinger, B. E. "Volume Dependence of the Elastic Equation of State. 2. Solution Cured Poly(dimethylsiloxane)," *Macromolecules*, 1981, 14:1445-1448).

Nanoparticles preferably are surface functionalized by heterogeneous vapor-phase polymerization of siloxane monomers at the "particle surface proximity" and may be catalyzed using alkali metal methoxide salts. Surface functionalization can be characterized by thermogravimetric analysis (TGA), as well as magic angle spinning (MAS) and cross-polar magic angle spinning (CP MAS) solid-state NMR techniques. Nanoparticles may also be functionalized with a greater amount of surface functionalization precursors to form surface treatments that contain polymer loops.

MNSS Synthesis Process

One exemplary method of tethering and functionalizing the nanoparticles surfaces comprises mixing the substantially spherical, passivated superparamagnetic and/or non-magnetic nanoparticles with coupling agents and siloxane monomers. The mixture is reacted at a temperature (e.g., sufficient to vaporize the siloxane monomers), in an environment (e.g., in the presence of a suitable catalyst, such as a methoxide salt), and for a time that is effective for the coupling agent to tether the nanoparticles together forming the MNSS network, and the surface functionalization precursors to polymerize in the "particle surface proximity," functionalizing the passivated magnetic and non-magnetic nanoparticles. Volatile by-products may be driven off as the MNSS mixture is heated. The nanoparticles, coupling agents, and the surface functionalization precursors are added in quantities effective to enable a specific separation.

Preparation of Exemplary MNSS Materials.

$Fe_2Co$ superparamagnetic nanoparticles (about 20 nm particle size) were passivated with TEOS and IGEPAL CO 520 in water under basic conditions (pH approximately 9), as described in Example 1, to afford passivated $Fe_2Co$ superparamagnetic nanoparticles comprising a silica coating in an amount about 10% greater than required to achieve complete surface coverage. A combination of bis(triethoxysilyl)octane and a monomer mixture of a 3-glycidoxypropyl-substituted siloxane and a phenyl-substituted siloxane (at four different monomer ratios) was combined the passivated nanoparticles and then reacted in the presence of sodium methoxide catalyst to polymerize the siloxane monomers and tether the nanoparticles into an MNSS network with junction functionality of about 2.6. The resulting polysiloxane coating over the surface of the nanoparticles comprised dihydroxypropyl and phenyl substituents. Four MNSS examples were prepared, with the dihydroxypropyl/phenyl monomer ratios provided in Table 2.

Example 3

MNSS—Sugar Sorption

MNSS sugar sorption uptake or capture was quantified in single-pass sorption experiments using synthetic hydrolysate liquids containing glucose or xylose in water at a sugar concentration of about 30 g/L and expressed as mass % sugar sorbed per mass of MNSS. The incorporation of phenyl groups into the surface treatment depressed sugar sorption. Evaluation of surface functionalization processes reveals the efficacy of the surface treatment is process dependent and control of surface functionalization connectivity is critical to high sorption. The data in Table 2 are averages of 2 to 6 replicate experiments.

Glucose is the primary monomeric component in the cellulose polymer and xylose is the primary monomeric component in hemicellulose polymer. They are both present biomass.

TABLE 2

MNSS Sugar Capture Efficiency

| Sample | Dihydroxylpropyl/ Phenyl Ratio | Surface Coverage | Glucose Uptake | Xylose Uptake |
|---|---|---|---|---|
| 1 | 0.942 | 143.9% | 11.71% | — |
| 2 | 30 | 124.3% | 15.27% | 15.31% |
| 3 | 30 | 125.5% | 15.01% | 15.85% |
| 4 | 0.501 | 109.2% | 11.15% | 10.42% |

Example 4

MNSS with Flotation Separation

The separation of lipophilic products from a process stream, such as non-polar hydrocarbons and lipids, can be achieved by producing MNSS with lipophilic pendent groups on the polysiloxane, such as, e.g., hexyl, octyl, dodecyl, and or octadecyl groups, as described elsewhere herein. Optionally, the separation process can employ hydrocyclone separation of hydrocarbon products and hydrocarbon product complexes that are less dense than the process stream, and/or do not wet the process stream; magnetic separation of MNSS would follow hydrocyclone separation. The use of a hydrocyclone adds value by affecting the separation of process solids from the hydrocarbon product complex.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While particular elements, embodiment, and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features, which come within the spirit and scope of the invention.

What is claimed is:

1. A particulate magnetic nanostructured solid sorbent (MNSS) material comprising a plurality of particles, each particle of the MNSS comprising a plurality of nanoparticles tethered together by molecular chains having at least two ends per chain, each chain comprising a substantially linear hydrocarbon, a poly(alkylene oxide), or a combination thereof, the ends of the chains connecting the nanoparticles in a three-dimensional elastic network; wherein the network has a junction functionality of about 2.1 to about 6, with the nanoparticles as junctions of the network; a surface of at least some of the nanoparticles comprises a polysiloxane bearing sorption-aiding substituents selected from hydrophilic substituents, lipophilic substituents, and a combination thereof; the plurality of nanoparticles comprises superparamagnetic nanoparticles or a combination of superparamagnetic and non-magnetic nanoparticles; the superparamagnetic nanoparticles comprise nanocrystalline metallic cores with a passivating metal oxide coating around each core; and the nanocrystalline metallic cores have ferromagnetic or ferrimagnetic properties.

2. The particulate MNSS material of claim 1 wherein the nanocrystalline metallic cores are substantially spherical.

3. The particulate MNSS material of claim 1 wherein the nanocrystalline metallic cores of the superparamagnetic nanoparticles comprise metallic Fe, Co, or a combination thereof.

4. The particulate MNSS material of claim 1 wherein the superparamagnetic nanoparticles have a mean diameter of about 0.5 nm to about 100 nm.

5. The particulate MNSS material of claim 1 wherein the superparamagnetic nanoparticles have a mean diameter of about 2 nm to about 50 nm.

6. The particulate MNSS material of claim 2 wherein the non-magnetic nanoparticles comprise substantially spherical nanocrystalline particles.

7. The particulate MNSS material of claim 6 wherein the non-magnetic nanoparticles have a mean diameter of about 2 nm to about 50 nm.

8. The particulate MNSS material of claim 1 wherein the ends of the chains are bonded to the surfaces of the nanoparticles or to the polysiloxane through a silicon-to-oxygen bond.

9. The particulate MNSS material of claim 1 wherein the particles of the particulate MNSS have a mean diameter of about 0.1 to 1,000 microns.

10. The particulate MNSS material of claim 1 wherein the particles of the particulate MNSS have a mean diameter of about 50 to 300 microns.

11. The particulate MNSS material of claim 1 wherein the non-magnetic nanoparticles comprise a metal oxide.

12. The particulate MNSS material of claim 1 wherein the surfaces of at least some of the nanoparticles comprise a polysiloxane bearing hydrophilic substituents.

13. The particulate MNSS material of claim 1 wherein the surfaces of at least some of the nanoparticles comprise a polysiloxane bearing lipophilic substituents.

14. The particulate MNSS material of claim 1 wherein the polysiloxane bears substituent groups independently selected from the group consisting of amino, hydroxyl, mercapto, alkoxy, saturated or unsaturated alkyl, cycloalkyl, aryl and heteroaryl, in which the alkyl, cycloalkyl, aryl, and heteroaryl groups can be unsubstituted, or can be substituted with one or more suitable substituent selected from the group consisting of alkyl, cycloalkyl, aryl, heteroaryl, amino, hydroxyl, mercapto, alkoxy, a carboxylic acid, a phosphonic acid, a sulfonic acid, a carboxylic ester, a carboxylic amide, a carboxylic anhydride, a saccharide (sugar), a halogen, and or a salt of any of the foregoing groups that is ionizable.

15. The particulate MNSS material of claim 1 wherein the passivating metal oxide coating comprises a silicon oxide or aluminum oxide material.

16. A method of separating a target organic compound from a liquid medium, the method comprising the steps of:
 (a) contacting the liquid medium containing the target organic compound with the MNSS material of claim 1 for a time sufficient to sorb at least a portion of the target organic compound from the aqueous fluid to form a MNSS-target compound complex; and
 (b) separating the complex from the aqueous fluid via magnetic separation.

17. The method claim 16 wherein the aqueous fluid contains less than 15 wt % of the target organic compound prior to contacting with the MNSS material.

18. The method claim 16 wherein the magnetic separation comprises magnetocollection, magnetoflocculation, or magnetoanisotropic sorting.

19. The method claim 16 including the additional step (c) of recovering the target organic compound from the MNSS material following step (b) by one or more of the following processes: magnetostriction, pH shock, thermal shock, mechanical deformation, or solvent extraction.

20. A method of preparing the MNSS material of claim 1 comprising the steps of:
 (a) heating a mixture comprising nanoparticles, a coupling agent, and a polymerizable siloxane monomer, and optionally a solvent, at a temperature and in relative quantities sufficient for the coupling agent to tether the nanoparticles to a selected degree of junction functionality of about 2.1 to about 6, and for the siloxane monomer to form a polysiloxane on the surface or in the surface proximity of the nanoparticles, thereby forming the particulate MNSS material; and
 (b) optionally removing any volatile by-products or solvent from the MNSS material;
 wherein the nanoparticles comprise superparamagnetic nanoparticles or a combination of superparamagnetic nanoparticles and non-magnetic nanoparticles; the superparamagnetic nanoparticles comprise nanocrystalline metallic cores with a passivating metal oxide coating around each core; and the nanocrystalline metallic cores have ferromagnetic or ferrimagnetic properties; the coupling agent comprises a substantially linear hydrocarbon chain, poly(alkylene oxide) chain, or a combination thereof, each chain has at least two ends, and the ends of the chains include functional groups capable of covalently bonding with the nanoparticles; and the polymerizable siloxane monomer bears one or more hydrophilic substituent, lipophilic substituent, or a combination of hydrophilic and lipophilic substituents.

* * * * *